July 26, 1932.  J. G. SWAIN  1,869,318
AIRPLANE WHEEL
Filed Aug. 16, 1929   2 Sheets-Sheet 1

INVENTOR
JOSEPH G SWAIN.
BY
Ely & Barrow
ATTORNEYS.

July 26, 1932.  J. G. SWAIN  1,869,318
AIRPLANE WHEEL
Filed Aug. 16, 1929     2 Sheets-Sheet 2

INVENTOR
Joseph G. Swain.
BY
Ely & Barrow
ATTORNEYS

Patented July 26, 1932

1,869,318

UNITED STATES PATENT OFFICE

JOSEPH G. SWAIN, OF AKRON, OHIO, ASSIGNOR TO THE FIRESTONE STEEL PRODUCTS COMPANY, OF AKRON, OHIO, A CORPORATION OF OHIO

AIRPLANE WHEEL

Application filed August 16, 1929. Serial No. 386,349.

This invention relates to wheels for airplanes or the like and more particularly to wheels for supporting the tail or rear of the fuselage.

An object of the invention is to provide wheels of this general type which permit easy and rapid tire changes.

A further object is to design a wheel assembly which is readily removable from its support.

Again an object of the invention is to construct the wheel mount so that the wheel can be removed from its supporting axle, the bearings being carried in the wheel.

It is to be understood that the invention is not limited in application to the specific form shown and described herein.

In the accompanying drawings.

Figure 1:
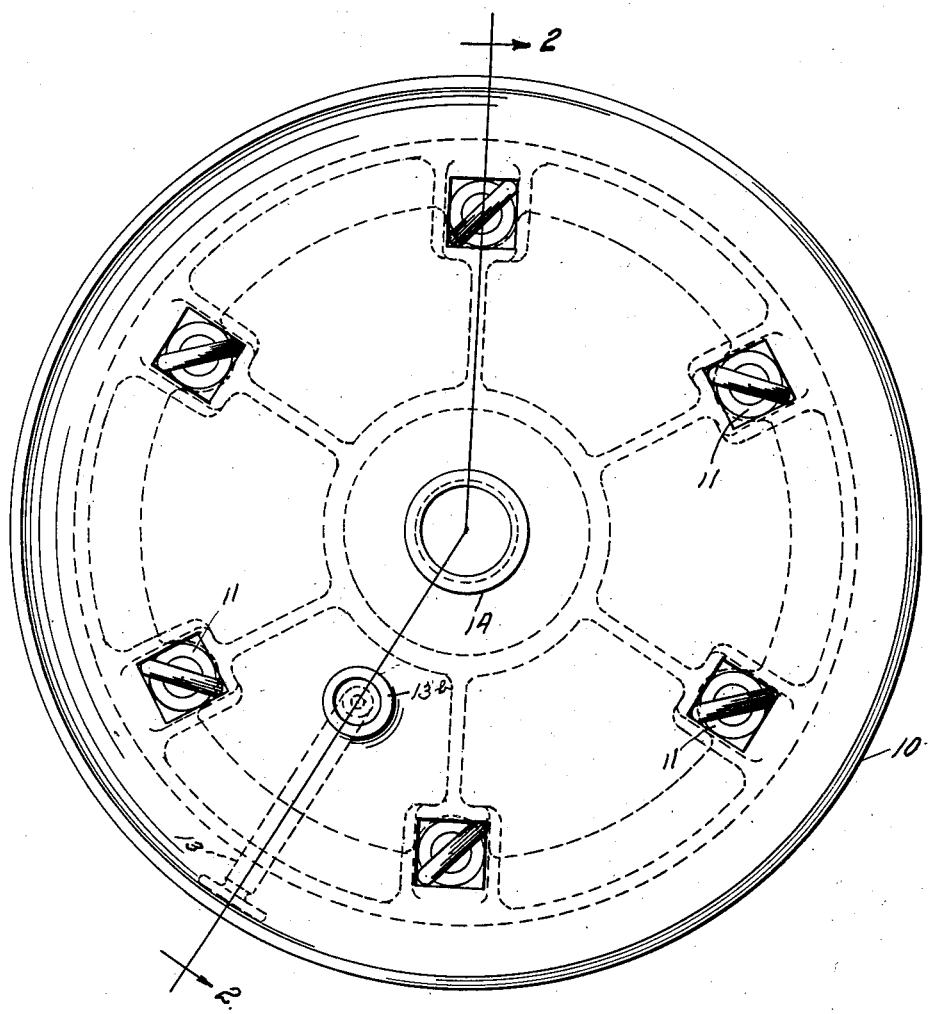
Figure 1 is a side elevation of a wheel embodying the features of the invention.
Figure 2:
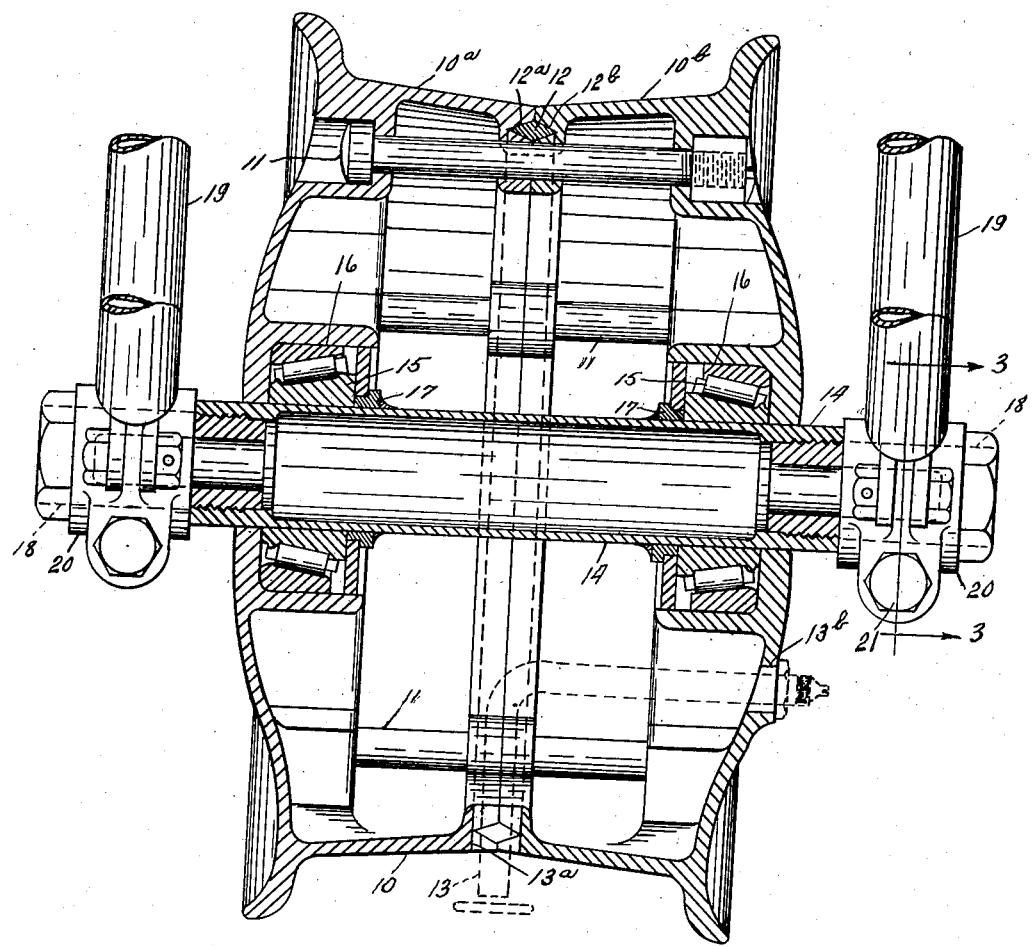
Figure 2 is a sectional view on line 2—2 of Figure 1 and showing in addition a fork supporting the wheel assembly.
Figure 3:
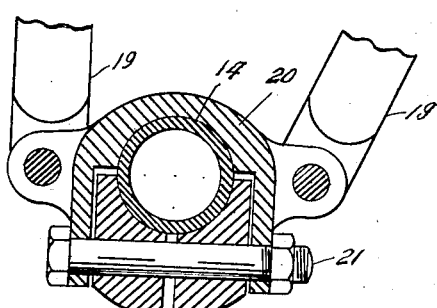
Figure 3 is a sectional view on line 3—3 of Figure 2.

A wheel 10 of suitable strong light weight material is formed circumferentially split into two parts 10ª and 10ᵇ which are clamped together. This may be accomplished, for example, by provision of a plurality of bolts 11 at spaced intervals near the circumference of the wheel, a transversely split aligning ring 12 which may be diamond shaped in section, being provided to engage in opposed triangular grooves 12ª and 12ᵇ on the wheel parts. This construction facilitates in properly aligning the wheel parts and holding them in their correct axial positions in the assembly. It should be noted here that the ring 12 may be split, not only to be self-adjustable, but to allow a valve stem, indicated at 13 by the dotted lines, to project therethrough. Holes 13ª and 13ᵇ in the rim, and one sidewall respectively of the wheel permit the valve stem to extend through the rim and the side of the wheel, thus allowing easy inflation of a tire on the wheel.

An axle 14, which is preferably hollow, supports the wheel assembly through the agency of combined radial and thrust bearings 15. The bearings are secured in axial sleeves 16 provided on the insides of the wheel halves 10ª and 10ᵇ, and are positioned when the wheel is assembled on the axle against collars 17 secured on the axle.

The ends of the axle 14 are tapped to receive stud bolts 18 therein, which are carried at the ends of a fork 19 preferably by means of clamps 20. The clamps 20 may include removable sections 20ª held in place by a clamping bolt 21.

The stud bolts 18, when run up tight, hold the clamps 20 against the ends of the axle 14. The clamping bolts 21 are then drawn up which prevents the stud bolts 18 from working loose.

When a tire change is necessary, the procedure is as follows: The bolts 21 are loosened and removed, permitting the clamping sections 20ª to fall out. The stud bolts 18, which may be made hollow to reduce weight are run back slightly out of their tapped sockets, thus permitting the whole wheel assembly to drop out of the clamps 20 and out of the fork 19. The bolts 11 and any valve nuts are then removed after which the parts 10ª and 10ᵇ of the wheel may be pulled apart, the bearings being carried in the sleeves 16 of the wheel parts. To assemble the wheels, the parts of the wheel are mounted on axle 14 and drawn together by bolts 11 with ring 12 therebetween, the wedging action of which draws the wheel parts into proper axial alignment. The assembled wheels and axle is then mounted in the fork, the bolts at the ends of the axle being secured in clamp 20 as shown.

It is obvious that the invention is capable of application in other than the specific form shown and described. Accordingly, various modifications of the invention can be resorted to without departing from the spirit of the invention or the scope of the appended claim.

What is claimed is:

An airplane wheel construction including in combination, a wheel split circumferentially into two parts, the abutting edges of said wheel parts being provided with inwardly extending radial flanges, said flanges being formed with opposed annular grooves and with a series of aligned apertures radially inwardly of said grooves, a ring adapted to lie in said opposed grooves to hold said parts in axial alignment, and means extending through said aligned apertures for clamping said parts together and for maintaining said parts in circumferential alignment.

JOSEPH G. SWAIN.